Nov. 1, 1966  W. A. DRUGAN ETAL  3,281,978

DISPLAY HOLDER FOR SHOPPING CART

Filed May 26, 1964

INVENTORS
WAYNE A. DRUGAN,
NEIL M. CLARK
BY
Schroeder & Siegfried
ATTORNEYS

United States Patent Office 3,281,978
Patented Nov. 1, 1966

3,281,978
DISPLAY HOLDER FOR SHOPPING CART
Wayne A. Drugan, Valley City, N. Dak., and Neil M. Clark, St. Louis Park, Minn., assignors, by direct and mesne assignments, to Drugan-Severson Inc., Valley City, N. Dak., a corporation of North Dakota
Filed May 26, 1964, Ser. No. 370,187
10 Claims. (Cl. 40—308)

This invention relates to display holders for shopping carts and more particularly to an improved display holder for a shopping cart which is readily mounted on any conventional cart and will display varying store information and advertising in a self service type store.

While display holders have been used in connection with shopping carts in the past, they have generally been complex in structure, difficult to view, cumbersome and quite often inaccessible from a standpoint of altering the material displayed therein.

The present invention is directed to a simplified display holder which may be readily mounted on the handle of any conventional shopping cart and provide adequate space for store information and advertising. It is readily movable to display all such material, is located or positioned at a point where it will be clearly viewed for proper display purposes and does not encumber the cart. Further, it may be readily changed or altered with respect to the information thereon and does not prevent nesting of the cart with others. This improved display holder is simple in design and construction and is economical from a cost standpoint. It employs a multipart construction which includes a pair of supporting collars adapted to be readily slipped on a cart handle without disassembly of the cart and when so positioned thereon mount supporting structure for the advertising as well as transparent retaining covers to position the same and permit ready viewing of the advertising material thereon. This improved shopping cart display holder when positioned on the shopping cart handle is securely attached thereto such as not to be dislodged or damaged through normal cart usage and further does not hinder the normal use of the shopping cart either from a parcel carrying standpoint or from a stacking standpoint. Further, the display holder permits the mounting of a large amount of information thereon which may be readily viewed by rotation of the holder.

It is therefore an object of this invention to provide an improved display holder for a shopping cart.

Another object of this invention is to provide a display holder for a shopping cart which is simple in design, readily adaptable for mounting on any conventional shopping cart, and is economical in cost.

A further object of this invention is to provide an improved display holder for a shopping cart in which a relatively large volume of information may be included thereon and the printed material on the shopping cart may be readily changed.

A further object of this invention is to provide an improved display holder for a shopping cart which does not alter or impede normal usage of the shopping cart.

These and other objects of this invention will become apparent from a reading of the attached description together with the drawings wherein.

Figure 1:
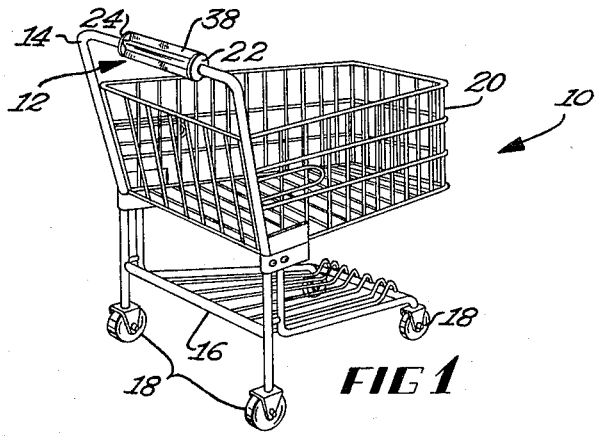
FIGURE 1 is a perspective view of the improved display holder mounted on a shopping cart.

The improved shopping cart display holder is shown in FIGURE 1 incorporated in a conventional shopping cart which is designated by the numeral 10. The display holder 12 is mounted on the handle 14 of the shopping cart which handle is generally connected to and forms a part of the support structure 16 for the shopping cart such that it is not readily removable therefrom. This support includes the casters or wheels 18 which provides ready mobility to the shopping cart. Attached to the support 12 is the basket or parcel carrying portion 20 of the shopping cart which is normally positioned ahead of and slightly below the handle 14 of the cart. In FIGURE 1, it will be seen that the improved display holder 12 is mounted on the handle and located normally between the portions of the handle wherein the operator or the person pushing the cart grasps the same in plain view or for observation by the person pushing the cart so as to readily display information thereon. This display holder is rotatable on the handle such that a variety and relatively large quantity of information may be displayed thereon which information may include advertising as well as guide information conventionally used in self service type markets.

Figure 2:
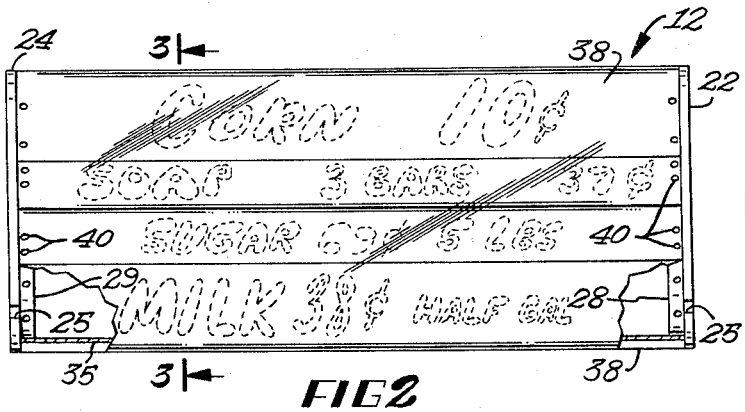
FIGURE 2 is a plan view of the display holder.
Figure 3:
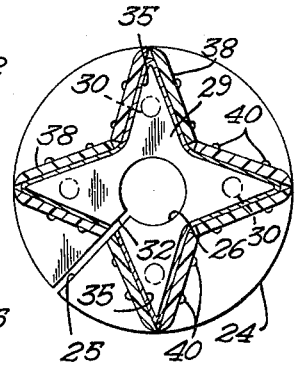
FIGURE 3 is a sectional view of the display holder taken along the lines 3—3 of FIGURE 2.

The actual details of the display holder in its preferred embodiment will be best seen in FIGURES 2 and 3 which show plan and sectional views of the same respectively. The improved display holder is formed of a pair of collars 22, 24 which are generally cylindrical in form and include slots 25 therein. These collars are made of a plastic or readily deformable material such that they may be bent to slide over the handle and permit the collar to be mounted on the handle through an aperture 26 therein. A relatively close fit between the aperture 26 and the handle dimension is obtained such that the collar will be free to be rotated on the handle but held relatively snugly thereon. Included with the collars 22, 24 are shoulder means or supports 28, 29 which are identical in form and may be formed integral with or as separate parts and suitably attached to the collars through means such as screws, shown in phantom at 30. Such screws will be countersunk so as to provide a relatively smooth surface of the collar adjacent the hands of the operator. The shoulder means or supports 28, 29 are in the form of a polygon having a general star shaped configuration which shape, as will be later noted, may take varying numbers of sides. In FIGURES 2 and 3, a four pointed star configuration is disclosed giving the shoulder means the shape of a plurality of wedge shaped sides which originate near the periphery of the collar and extend inward toward the geometric center of the polygonal figure. The shoulder means 28, 29 include a similarly shaped aperture therein to coincide with the aperture 26 of the collar through which the handle 14 extends. Further, the shoulder means includes a similar slot 32 by means of which the shoulder supports may be slipped on the handle, these parts being also formed of a readily deformable or plastic material.

The four pointed shoulder support provides eight surfaces or sides of the wedge shaped stucture upon which advertising material or printed material may be supported.

The collars 22, 24 with the shoulder means 28, 29 thereon are positioned on the handle 14 such that they face one another and are normally positioned on the handles such that the points align and form planes parallel to the axis of the handle located at the geometric center of the display holder. The elongated strips of advertising material, shown at 35, are positioned between the similar surfaces on the shoulder means and transparent covers 38 of plastic material are positioned over the same and secured to the shoulders through suitable means such as screws 40. The covers may be single elongated strips rounded at the edges thereof to provide a smooth outer surface adjacent the periphery of the holder and the screws securing the same will penetrate the advertising material or printed material, usually in paper form, displayed and mounted under the covers 38. The elongated covers in width approach the radial dimension of the collar to give a maximum width for the advertising space or printed matter to be displayed under the same. Thus in assembled form as shown in FIGURE 3, the printed paper matter is positioned under the covers or on the polygonal shoulder means attached to the collars with the covers being positioned over the same with the cover and advertising material secured thereon through suitable means, shown in FIGURE 3 as screws. In the configuration shown in FIGURES 2 and 3, eight such surfaces are available to display the advertising material or store information to be viewed by the person pushing the cart. Access to the information is readily available by merely rotating the display holder on the handle.

The physical size of the display holder is such as to not interfere with the operation of the cart either in the service of carrying or holding the parcels of the operator or in the nested position normally used by self service type markets for storing the carts when they are not in use. The positioning of the display holder 12 on the handle positions the holder in ready viewing access to the operator of the cart or the shopper and at the same time does not locate the display holder where it could be covered by bundles or to be contacted by bundles and dislocated or damaged by engagement of the cart with objects such as other carts or display counters in the store. The positioning of the display holder is also readily accessible for the store owner to change the information thereon. This can be accomplished merely by removal of the individual covers and inserting new sheets of material under the same to be secured thereon by the screws and the cover. The connection between the covers and the shoulder means definitely aligns and positions the collars and holds the entire display holder in assembled relationship.

Figure 4:
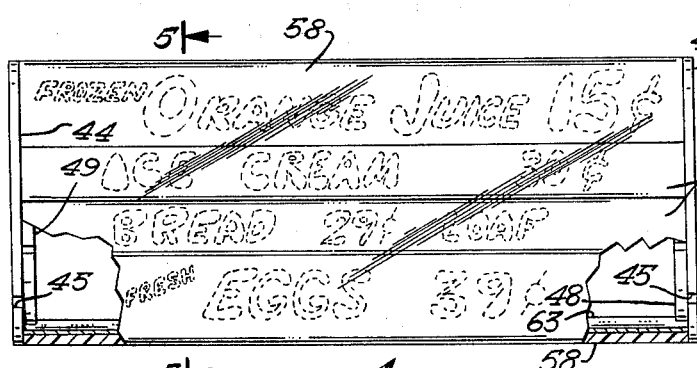
FIGURE 4 is a plan view with parts in section of an alternate embodiment of the improved shopping cart display holder.
Figure 5:
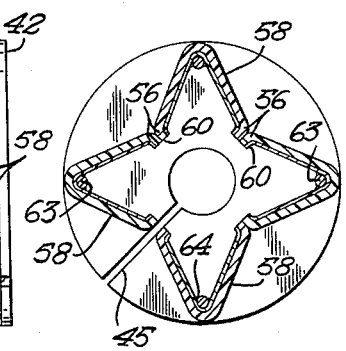
FIGURE 5 is a sectional view of the display holder of FIGURE 4 taken along the lines 5—5 therein.

The embodiment shown in FIGURES 4 and 5 show an alternate construction for the display holder which still utilizes the four pointed star shaped or polygonal outline or configuration for the shoulder means. In this embodiment, the collars 42, 44 have integrally formed therewith the shoulder portions or means 48, 49 to eliminate the necessity of external fastening. Similarly, the covers 58 are elongated V shaped members of transparent material with flanges 56 at the edges thereof which are turned in and adapted to fit into recesses 60 in the shoulder means at the extremities of the sides remote from the circumferential periphery of the collar. In this embodiment, the advertising material 35 may be printed on sheets of paper which extend over the two surfaces defining the wedge shaped configuration for the points of the polygonal figure and the covers 58 may be slipped over the same with extremities 56 thereof engaging the recess or slot 60 in the shoulders to clamp the advertising material and the covers on the shoulder means and between the collars. The collars include slots 45 which extend through the collar proper on the shoulder so that the entire assembly may be deformed and slipped on the handle 14 of the shopping cart for installation purposes. FIGURES 4 and 5 show in addition rod like members 63 extending between the shoulder means 48, 49 of each collar and resting in recesses 64 therein which rod like members serve to support the paper or printed material between the collars. If necessary, these rod like members may be threaded at their extremity (not shown) and secured to the collars to aid in the spacing and assembly of the same.

Figure 6:
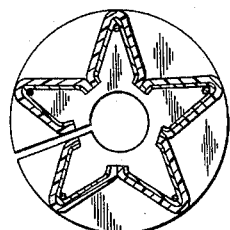
FIGURE 6 is a sectional view of a still further embodiment of the improved display holder for a shopping cart.

FIGURE 6 shows still a further embodiment of the display holder utilizing a five pointed star like configuration to indicate that the polygonal figure may take any number of sides. Although not shown, it will be understood that the polygonal figure defining the shoulders may be a three pointed figure, four, five, six and still higher sided figure. The only limitation to the number of sides is the axial spacing of the points of the polygonal figure on the circumference to provide adequate viewing surface of the entire side. In each instance, the length of the sides of the wedge shaped figure or the surfaces of the star like configuration will be close in length to the radial dimension of the collar to provide an adequate mounting surface for printed material. When too large a number of pointed support or shoulder is used, the surfaces become close together and it is not possible to adequately view the same. We have found that any arrangement between a three pointed star like configuration up to an eight pointed star like configuration is satisfactory for this purpose. In the embodiment shown in FIGURE 6, the same constructional details are employed as that shown in FIGURES 4 and 5 in that the shoulder means are integral with the collars and the covers are V shaped in cross section and snap into recesses in the shoulders. In the embodiments of FIGURES 4, 5 and 6, the advertising may be changed by grasping the cover means and rotating it slightly to disengage the extremities 56 from the notches 60. The flexible cover of transparent material, preferably plastic, permit such engagement and removal without damage to the parts.

In considering this invention it should be remembered that the present disclosures are intended to be illustrative only and the scope of the invention should be determined by the appended claims.

We claim:

1. A display holder for a shopping cart having a wheeled support with a basket thereon and a tubular handle connected to the wheeled support and extending around one end of the basket comprising, a pair of collars of flexible material each having a radial slot therein and adapted to be deformed to slip over the tubular handle and mount thereon, shoulder means on one surface of each of said collars, each of said shoulder means having a plurality of wedge shaped sides which originate near the peripheral edge of the respective collar, an aperture located at the geometric center of each collar through which the tubular handle of the cart is adapted to extend, said collars with said shoulder means thereon being adapted to be positioned on the handle of the cart in a spaced parallel relationship with the shoulder means facing one another, a plurality of elongated transparent cover means positioned between said collar means and engaging the wedge shaped sides of the shoulder means being secured thereon, said holder being adapted to be rotatable on the handle of the cart and to have sheets of printed paper with advertising thereon positioned between the corresponding sides of the shoulder means of the respective collars and held in position by the cover means to be viewed therethrough.

2. The display holder of claim 1 in which the shoulder means are secured to the collar means through screws and the cover means are secured to the shoulder means through screws.

3. The display holder of claim 1 in which the shoulder means are formed integral with the collars and include recesses at the ends of the sides of the wedge shaped form adjacent the central aperture therein, and the cover means are formed of a flexible plastic material generally V shaped in cross section with transversely extending ridges at the extermities thereof such that the cover means are adapted to slide over and snap on the shoulder means with the transversely extending sections resting in the recesses of the shoulder means to cover two sides thereof.

4. The display holder of claim 1 in which the length of the wedge shaped sides of the holder means is substantially equal to the radial dimension of the collar means.

5. The display holder of claim 3 and including support means resting on and extending between the shoulder means and adapted to aid in the support of the printed sheets of material under the cover means.

6. A display holder for a shopping cart having a wheeled support with a basket thereon and a tubular handle connected to the wheeled support and extending around one end of the basket comprising, a pair of collars mounted on the tubular handle, shoulder means on one surface of each of the collars, each of the shoulder means being in the form of a polygonal figure which is generally star shaped in form with the points of the figure being disposed adjacent the peripheral edge of the respective collar, aperture means located at the geometric center of the polygonal figure through which the tubular handle of the cart is adapted to extend, said collars with the shoulder means thereon being positioned on the handle in a spaced parallel relationship with the shoulder means facing one another, a plurality of elongated transparent covers positioned between the collars and mounted on the sides of the polygonal figure of the shoulder means on the collars, and strips of paper material with display matter thereon positioned between the sides of the respective star shaped polygonal figures on the shoulder means and under the cover means to be secured in position by the cover means and viewable therethrough.

7. The display holder of claim 6 in which the polygonal figure generally star shaped in form has at least three points and no more than eight points defining the star shaped figure.

8. The display holder of claim 7 in which the collars include slots therethrough to permit assembly on the tubular handle and with provision for securing the same for rotation on the handle.

9. The display holder of claim 7 in which the shoulder means and the collar are formed separate and held together through suitable securing means and the cover means are secured to the shoulder means through screws.

10. The display holder of claim 7 and including means positioned between the shoulder means and under the cover means to aid in the positioning of the printed paper therebetween.

References Cited by the Examiner

UNITED STATES PATENTS

| Re. 24,297 | 4/1957 | Brockway | 40—308 |
| 2,918,741 | 12/1959 | Welter et al. | 40—308 |
| 3,218,748 | 11/1965 | Hopp | 40—308 |

EUGENE R. CAPOZIO, *Primary Examiner.*

W. GRIEB, *Assistant Examiner.*